United States Patent [19]
Kochendorfer et al.

[11] 4,335,586
[45] Jun. 22, 1982

[54] SHAFT-DISC ASSEMBLY

[75] Inventors: Richard Kochendorfer; Helmut Vogler, both of Stuttgart, Fed. Rep. of Germany

[73] Assignee: Deutsche Forschungs- und Versuchsanstalt für Luft- und Raumfahrt e.V., Bonn, Fed. Rep. of Germany

[21] Appl. No.: 92,039

[22] Filed: Nov. 7, 1979

[30] Foreign Application Priority Data

Nov. 8, 1978 [DE] Fed. Rep. of Germany ....... 2848355

[51] Int. Cl.³ .............................................. F16D 3/17
[52] U.S. Cl. ......................................... 464/81; 464/93
[58] Field of Search ................. 64/11 R, 9 R, 27 NM; 51/168, 166 R

[56] References Cited

U.S. PATENT DOCUMENTS 2,773,365 12/1956 Delf et al. ........................... 64/11 R
2,943,464 7/1960 Voges ............................. 64/27 NM
3,036,412 5/1962 Tocci-Guilbert ...................... 51/168
3,084,852 4/1963 Seavey ............................ 64/27 NM
3,096,106 7/1963 Wanner .......................... 64/27 NM
3,362,191 1/1968 Lovette ............................... 64/11 R
4,244,240 1/1981 Rabenhorst ......................... 64/11 R

OTHER PUBLICATIONS

"Ceramics for High-Performance Applications", Proceedings of the Second Army Materials Technology Conference, Hyannis, Massachusetts, Nov. 13-16, 1973.

Primary Examiner—Ira S. Lazarus
Assistant Examiner—Magdalen Moy
Attorney, Agent, or Firm—Laubscher, Philpitt & Laubscher

[57] ABSTRACT

A disc is centered and secured on a shaft by means of flexible webs which extend parallel to the shaft and lie against the inner surface of a central aperture in the disc, and by radially extending tongues fixed to the shaft and entering into corresponding radial slots in the disc. As the assembly rotates, the webs are urged outwards by centrifugal force, to apply a radial compression force to the material of the disc.

8 Claims, 4 Drawing Figures

SHAFT-DISC ASSEMBLY

BRIEF DESCRIPTION OF THE PRIOR ART

The present invention relates to a shaft-disc assembly where the disc is mounted coaxially on the shaft for rotation therewith. An example of such an assembly is a disc-shaped turbine wheel on a turbine shaft.

A great variety of solutions has already been offered for the rotation-secured mounting of a wheel on a shaft and its centering. In this context, problems arise especially in those cases where the disc consists of a material other than that of the shaft and when owing to differing thermal expansion and/or different deformation under the action of the centrifugal forces arising during rotation, different deformations of disc and shaft occur, because these lead, under certain circumstances, to destruction of the disc-shaft assembly.

Owing to the rotation of the disc, the latter is subjected to differing tensile stresses along its radius, so that in the region close to the axis, greater tensile stresses result than in the region remote from the axis. This leads to constructional problems especially in the case where discs are employed which have only a low tensile strength.

For example, in the construction of high-temperature turbines, constructional practice turned to making the turbine wheels from a ceramic material, which is highly temperature-resisting and, in consequence, makes possible operation at unusually high gas temperatures. On the other hand, ceramic materials have only a low resistance to tensile stress, whilst their resistance to compressional load is considerable. For this reason, turbine wheels of this kind have been surrounded with a hoop material of very high tensile strength, which subjects the turbine wheel in the rest state to a radially inward-oriented stress.

In effecting the rotation-secured fastening of a ceramic turbine wheel to a shaft, for example a steel shaft, the turbine wheel was constructed substantially thicker in the region close to the axis than in the region remote from the axis, so that by the thickening of the turbine wheel hub a higher tensile loading could be achieved. Such constructions are known for example from Patent Application P No. 24 60 739.4 and from the following literature sources:

(a) Walzer, P., & al.: Entwicklung eines Turbinenlaufrads aus Siliziumnitrit (Development of a silicon nitride turbine runner). Z Werkstofftechnik 8, 294 to 299 (1977), and (b) Nichols, B. F., Paluszny, A.: Techniques for Design of Small Ceramic Turbine Rotor, in: Burke/-Gorum/Katz, Editors: "Ceramics for High Performance Applications", Proc. 2nd. Army Materials Technology Conf., Hyannis (Mass.) 1973; Brook Hill Pub. Co., Chestnut Hill, (Mass.) 1974.

It is also known already to construct a turbine wheel from a ceramic material, made up of individual sector segments (German Pat. No. 2 507 512). In a construction of this kind, it is even more difficult to absorb peripheral stresses arising in the disc from centrifugal force.

SUMMARY OF THE INVENTION

An object of the present invention is to construct a shaft-disc assembly, such as a disc-shaped turbine wheel on a turbine shaft, in such a manner, that a rotation-secured and centered mounting of the turbine wheel on the shaft is achieved without additional dimensional increases of the turbine wheel, the linkage between the disc and the shaft ensuring rupture-free operation of the unit even at high temperatures and at high speeds of rotation.

According to the invention, there is provided a shaft and disc assembly, the disc being mounted coaxially on the shaft for rotation therewith, the assembly comprising a shaft, a disc with a central aperture having an internal diameter greater than the external diameter of the shaft and radial slots extending from the central aperture, a centering element mounted on the shaft, webs on the centering element extending substantially parallel to the shaft axis and lying against the internal surface of the central disc aperture, which webs, under the action of centrifugal force when the assembly is rotating can be resiliently pressed against said internal surface, and tongues rigidly fixed to the shaft and extending radially therefrom to project into the radial slots of the disc.

Owing to the resilient application of the webs of the centering elements against the inner face of the disc, a faultless centering of the turbine wheel on the shaft can be achieved, independently of the different thermal expansions of disc and shaft, respectively, and independently of mechanical deformation resulting from the centrifugal forces arising at high speeds of rotation. Moreover, the radially projecting tongues makes possible a form-locking rotary connection, the disc being displaceable in a radial direction relative to these tongues. For this reason, this connection is also free of disturbances due to differing mechanical deformations at high temperatures and high speeds of rotation.

BRIEF DESCRIPTION OF THE FIGURES

The following description of preferred forms of embodiment of the invention serves the purpose of a more detailed explanation in connection with the drawing.

In the drawing.

DETAILED DESCRIPTION

In the following the invention will be described with reference to the connection of a turbine wheel made of a ceramic material to a steel shaft, but it is to be pointed out that the novel shaft-disc assembly is not restricted to this particular application, but can in principle be employed in other shaft-disc assemblies as well.

Figure 1:
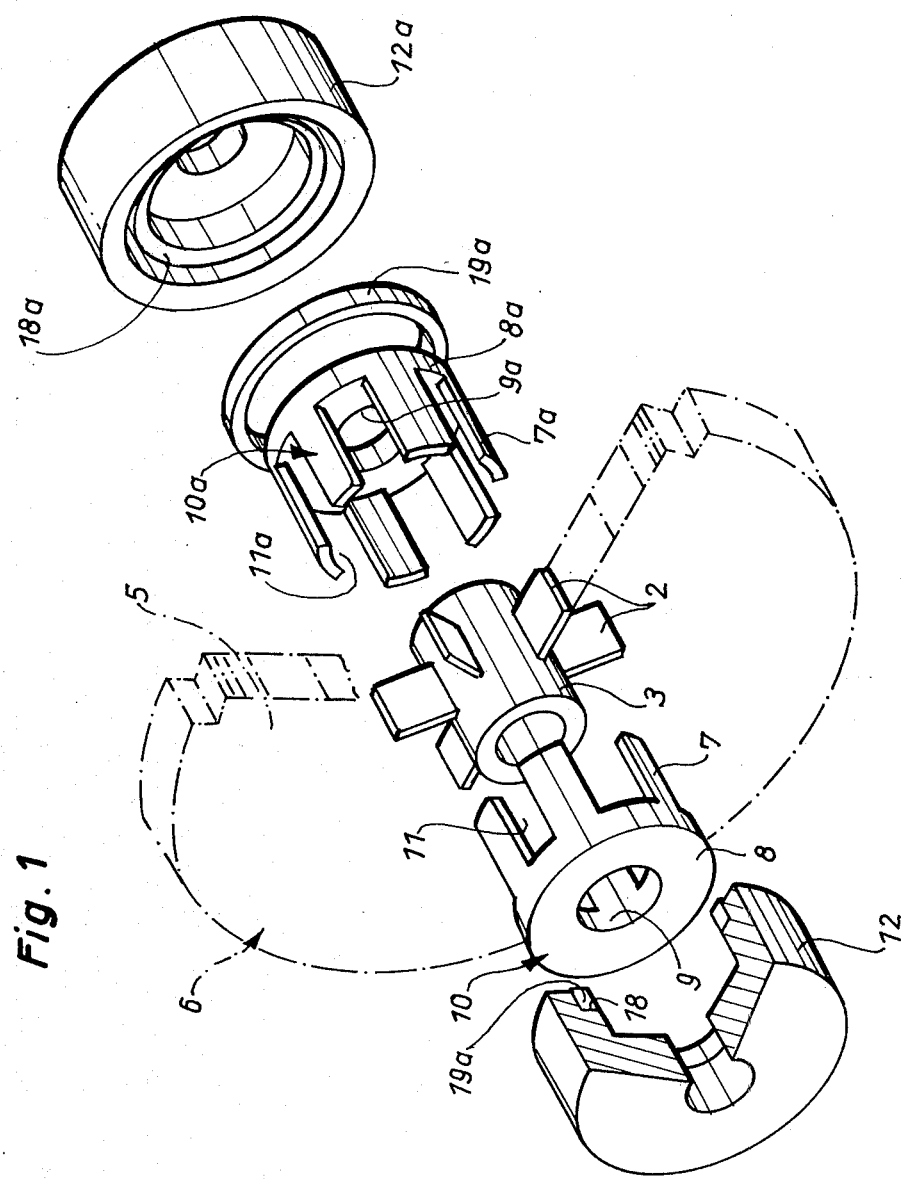
FIG. 1 is a perspective, schematic exploded view of a shaft-disc assembly.
Figure 3:
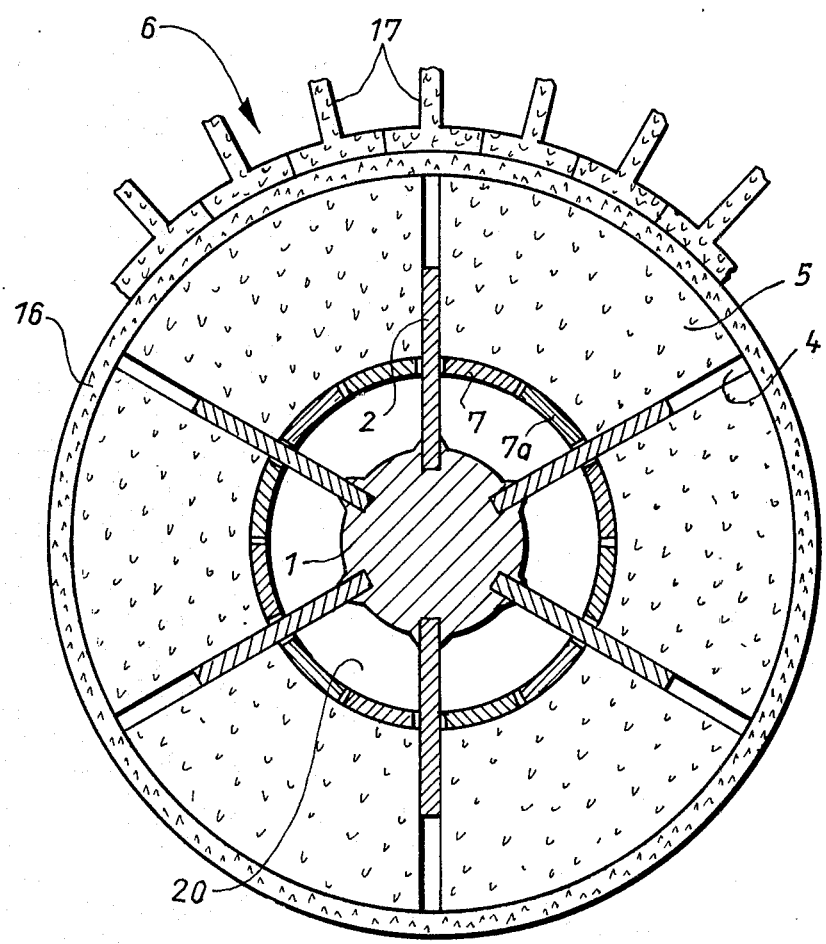
FIG. 3 is a sectional view of an alternative embodiment of a shaft-disc assembly in a plane extending parallel to the disc.
Figure 4:
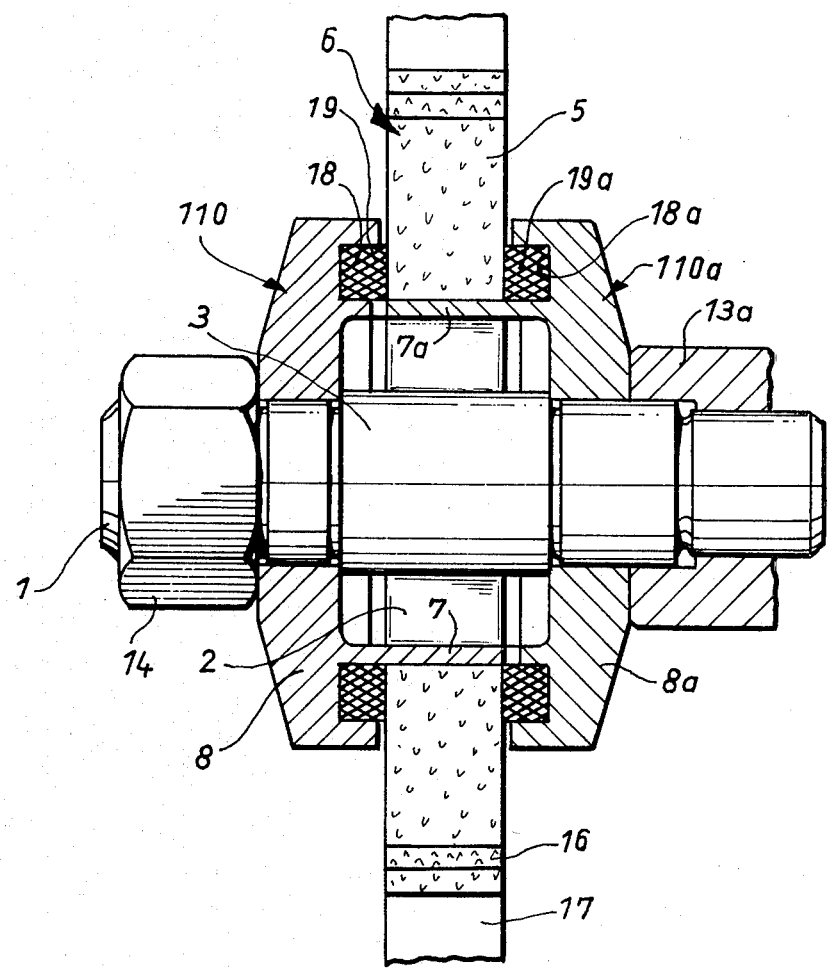
FIG. 4 is a partial longitudinal section of a further alternative embodiment of a shaft-disc assembly.

A plurality of radially outward-projecting tongues 2 are secured against rotation to a steel shaft 1, either in the manner shown in FIG. 3 by direct attachment to the shaft or in the manner apparent in FIGS. 1 and 4 by fitting of a sleeve 3 on the shaft 1 and rotation-secure connection of the two parts, in which case the sleeve 3 carries the radially outward projecting tongues 2.

The radially outward-projecting tongues 2 engage with their free ends, in the manner shown in FIG. 3, into slots 4 between circular segments 5, which in their totality make up a turbine wheel 6. In their region close to the axis, the inner faces of the circular segments lie against webs 7, 7a extending parallel to shaft 1, which webs are fastened to a circular front-end face 8, 8a, respectively. The faces 8 and 8a have central passage bores 9, 9a, respectively, with an internal diameter which is slightly greater than the external diameter of the shaft 1. In the following, the sub-units composed of front-end faces 8 and 8a and webs 7, 7a, will be referred to as centering sockets 10 and 10a, respectively. They are slipped from both sides of the fastening region on the shaft 1 in such a manner, that in each case the webs 7 and 7a of one centering socket 10 or 10a engage into gaps 11a or 11, respectively, of the other centering socket 10a or 10.

Figure 2:
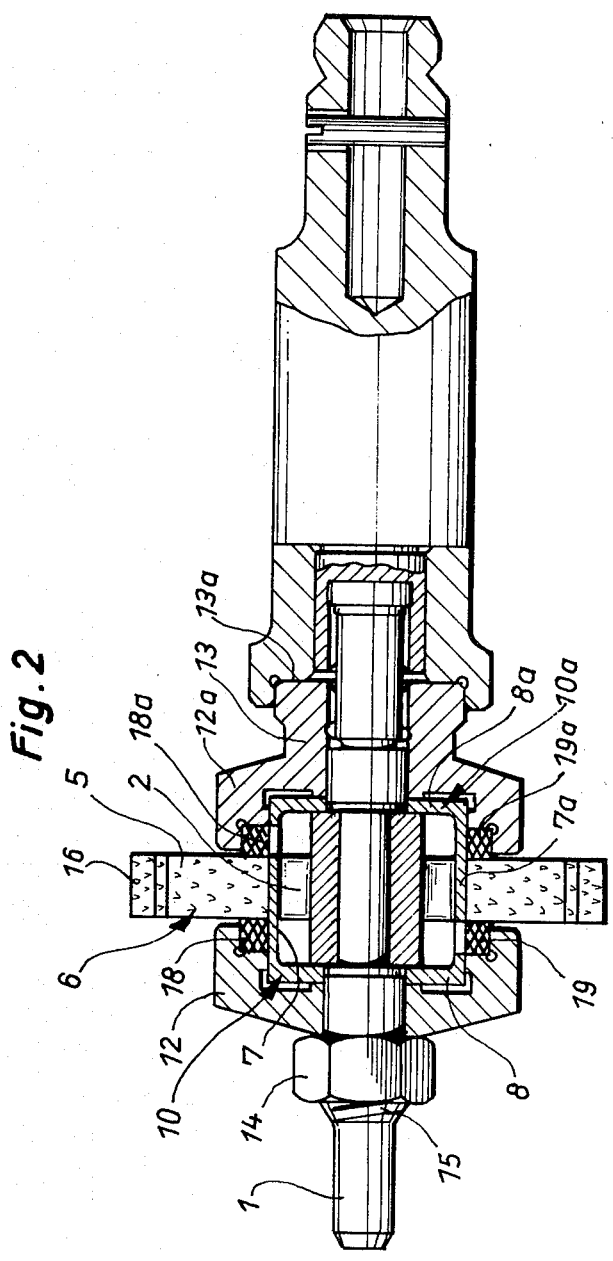
FIG. 2 is an axial partly sectional view of the shaft-disc assembly of FIG. 1.

In the embodiment illustrated in FIGS. 1 and 2, the centering sockets 10 and 10a are pressed from both sides against the front-end face of sleeve 3 by means of pressure flanges 12 and 12a, respectively, slipped on the shaft. For this purpose, the pressure flange 12a bears with its shaft 13 against a stop 13a fast with the shaft 1, whilst a nut 14, which is screwed on an external thread 15 or shaft 1, presses the pressure flange 12 against the pressure flange 12a. In this manner, a securing of the centering sockets against axial displacements is obtained.

FIG. 4 shows an embodiment where the pressure flanges and the webs 7, 7a are formed in one and the same member 110, 110a.

The sectors are surrounded by a ceramic ring 16. The construction of the turbine wheel is only partly shown in FIG. 3; as can be seen, the ceramic ring 16 has connected thereto schematically illustrated turbine blades 17, which may be encircled by a not shown shrunk-on hoop.

For axial fixing of the turbine wheel, the pressure flanges 12 and 12a have, on their side facing towards the turbine wheel and outside the centering sockets, annular grooves 18 and 18a, respectively, into which an elastically compressible material 19 and 19a is located, which, on one hand, bears against the bottom of the annular groove and, on the other hand, against the turbine wheel. This material may for example be a wire plait. It makes possible a displacement of the turbine wheel relative to the pressure flanges 12 and 12a in radial direction.

The circular segments of the turbine wheel consist preferably of a ceramic material.

The two centering sockets consist of an elastic, preferably metallic material. The webs 7 and 7a are only connected at one end with the corresponding front-end face of the centering sockets, the other end is free. Owing to this, during rotation of the shaft and with it of the centering sockets, the webs bend resiliently outwards, so that they apply with a frictional locking effect against the inner face of the turbine wheel 6 formed of circular segments 5, thus safely centering the wheel even at higher speeds of rotation. At the same time, all relative displacements of the turbine wheel and of the shaft as well as of the centering sockets, which arise due to differing thermal expansion coefficients and different ductility under the influence of centrifugal forces, are compensated.

The use of radial tongues 2 engaging into radial slots 4 for transmission of rotary movement also makes it possible for the turbine wheel to move in a radial direction relative to the shaft and to the tongues fastened thereto secure against rotation, so that here again differing expansions due to the reasons stated above cannot lead to destructive effects. The same applies to the axial positioning of the turbine wheel with the aid of the elastic material 19 and 19a.

The assembly of the above described disc-shaft linkage is of extreme simplicity, because all parts are simply slipped onto the shaft 1 and are thereafter pressed together by means of the nut 14. This achieves automatically a rotation-secured mounting of the turbine wheel on the shaft, which is faultlessly centered at any speed of rotation and retained in its axial position. Of importance is the fact that a reinforced construction of that region of the turbine wheel which is close to the axis can be dispensed with, because the turbine wheel is in fact not constructed as a solid disc, but as a ring, i.e., the disc has a relatively large aperture 20 close to its axis. In consequence, the turbine wheel can be lighter, so that the resulting tensile forces are smaller. In addition, the fabrication is substantially simplified, because in the conventional turbine wheels complicated cross-sectional profiles were required in order to take into account the stress orientation in their interior.

The embodiment shown in FIG. 4 is essentially similar in construction to the embodiment described with reference to FIGS. 1 to 3, for which reason corresponding parts bear the same reference numerals. The sole difference consists in that the centering sockets assume simultaneously also the function of the pressure flanges, that is to say, the pressure flanges and the centering sockets are integrally constructed. This allows a further simplification of assembly.

In principle it is also possible to construct the two centering sockets as a centering element in one piece in the form of a cage, which has webs interconnecting the two end faces. The only essential feature of the centering element is that the webs must be given the possibility of moving radially outwards under the influence of the centrifugal force, so that they are urged at any speed with an elastic force against the inner face of the circular segments. As a rule, however, this will be achieved more advantageously with a construction comprising webs free at one end than with a cage-like construction.

In order to ensure the elastic deformability of the webs, it is advantageous to make the centering sockets from a ductile material.

The turbine wheel illustrated in the drawings consists of a plurality of circular segments. It is also possible to employ a one-piece turbine wheel having corresponding radial slots, which however do not fully divide the individual regions of the turbine wheel into circular segments.

The elastic material between the pressure flanges, which preferably consists of a thermally highly resistant elastic steel wire plait, also prevents effectively oscillations of the turbine wheel segments.

We claim:
1. In a shaft and disc assembly of the type including a disc mounted coaxially on a shaft for rotation therewith, said assembly comprising
  (a) a shaft;
  (b) a disc containing a central aperture having an internal diameter greater than the external diameter of said shaft, said disc also containing radial slots extending from the central aperture, said disc being mounted concentrically on said shaft;
  (c) centering means mounted on the shaft, said centering means including web portions extending generally parallel to the shaft axis and lying against the internal surface of said central disc aperture, said web portions, under the action of centrifugal force when the assembly is rotating, being resiliently pressed against said internal surface, said centering means including a pair of centering sockets mounted on opposite sides of the disc, respectively, each socket having an end face extending substantially perpendicular to the shaft axis, and a plurality of integral webs extending axially from the outer edge of said end face through the central aperture in said disc and being free at their ends remote from said end face, said sockets being arranged so that webs from the two sockets alternate around a circumferential surface formed thereby; and (d) a plurality of tongues rigidly fixed to the shaft and extending radially therefrom into the radial slots contained in said disc.

2. The assembly of claim 1, wherein the disc consists substantially of ceramic material.

3. The assembly of claim 1, wherein the centering means is formed of a ductile material.

4. The assembly of claim 1, wherein the disc is secured against axial displacement by means of two pressure elements located on the shaft.

5. The assembly of claim 4, wherein an elastically compressible material is arranged between the pressure elements.

6. The assembly of claim 5, wherein the elastically compressible material is a steel wire plait.

7. The assembly of claim 4, wherein the pressure elements comprise flanges which are axially displaceable on the shaft, and tensioning members mounted on the shaft for displacing the flanges relative to one another.

8. The assembly of claim 4, wherein the pressure elements secure the centering element against axial displacement.

* * * * *